April 2, 1957 — R. S. KOFFORD — 2,787,284
AUTOMATIC WATER CONTROL FOR POULTRY
Filed Oct. 31, 1955
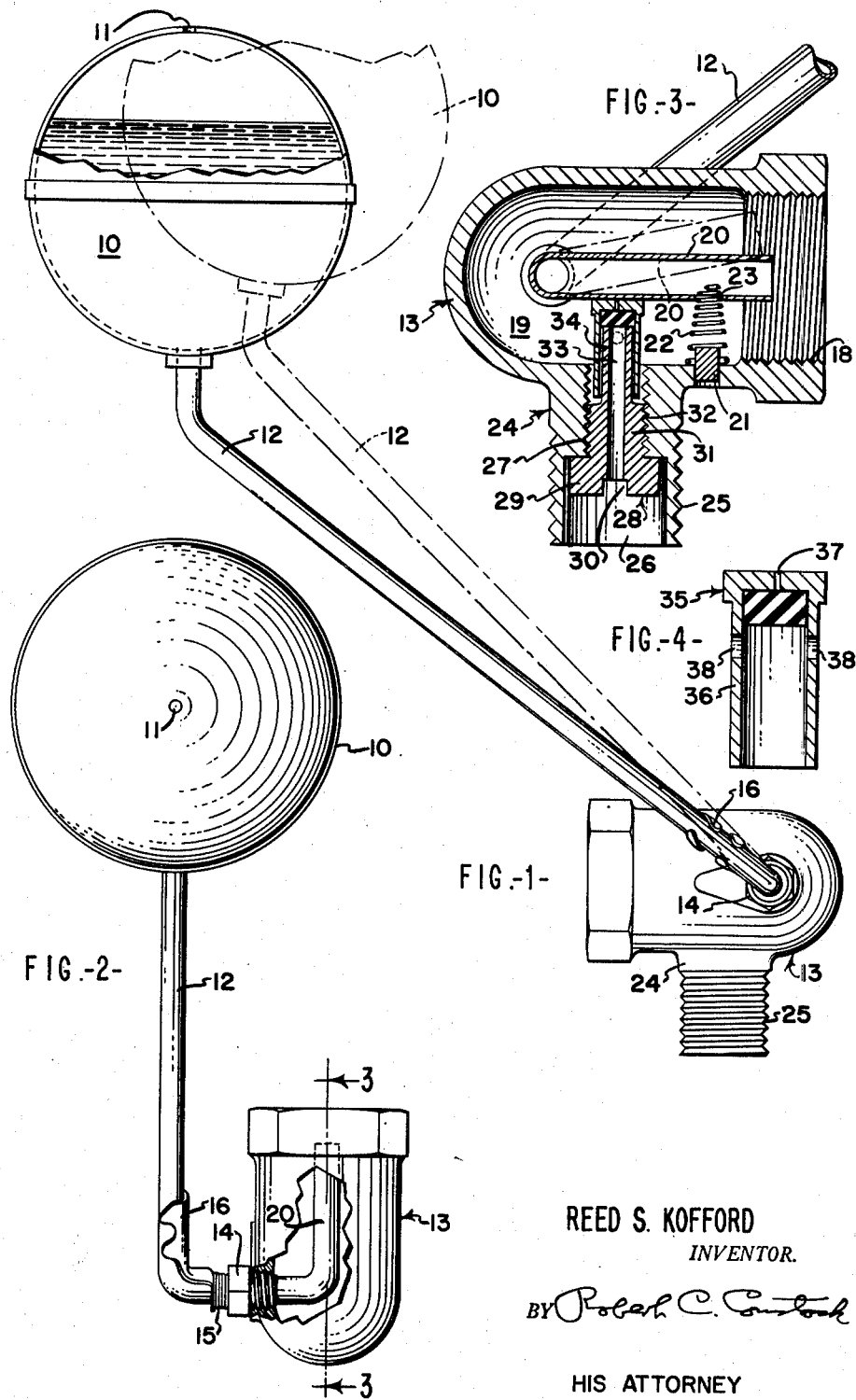
REED S. KOFFORD
INVENTOR.
BY Robert C. Comstock
HIS ATTORNEY

United States Patent Office 2,787,284
Patented Apr. 2, 1957

2,787,284

AUTOMATIC WATER CONTROL FOR POULTRY

Reed S. Kofford, Van Nuys, Calif.

Application October 31, 1955, Serial No. 543,861

9 Claims. (Cl. 137—408)

This invention relates to an automatic water control for poultry or other animals and more particularly to such a device which is adapted to be used in connection with a conventional source of high pressure water supply.

This application is a continuation in part and improvement upon the invention disclosed in my co-pending application for patent, Serial No. 435,509, filed June 9, 1954, now Patent No. 2,748,795 dated June 5, 1956.

It is an object of my invention to provide a device of the class described which acts as a "pressure reducer" by automatically providing a limited flow of water from a conventional high pressure source. It is a further object of my invention to provide such a device in which the weight of a quantity of water contained in a water reservoir which is connected to the source of water supply is used to control the operation of a valve which regulates the supply of water furnished to the animals.

Another object of my invention is to provide such a device in which the entire valve structure and related mechanism is contained within a single fitting which is easily connected to conventional water pipes, with only the reservoir and the tube leading thereto being external to the fitting.

A further object of my invention is to provide a device of the class described which contains anti-siphon means to prevent contaminated water from moving back from the poultry supply lines into the fresh water supply in the event of vacuum or suction occurring in the supply line or source.

It is also among the objects of my invention to provide such a device which is extremely simple in structure, economical to manufacture and efficient in operation.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a side elevational view of my device with the upper portion of the reservoir broken away and with the movement of the reservoir and lower tube indicated in dotted lines;

Fig. 2 is a top plan view of my device;

Fig. 3 is a sectional view of the same taken on line 3—3 of Fig. 2;

Fig. 4 is an enlarged sectional view of the control member.

A preferred embodiment which has been selected to illustrate my invention comprises a hollow water reservoir 10, which is adapted to hold a quantity of water. Reservoir 10 is provided adjacent the top thereof with an air vent 11, which permits air to enter and leave reservoir 10 inversely with the passage of water.

Reservoir 10 is mounted on one end of an elongated hollow tube 12, which extends angularly downwardly to a valve assembly 13. The opposite end portion of hollow tube 12 extends into valve assembly 13 through a screw threaded bushing 14. A coil spring 15 is wound around the portion of hollow tube 12 adjacent the outside of valve assembly 13. One end of coil spring 15 is attached to a clamp 16, which fits around hollow tube 12. The opposite end of coil spring 15 bears against the head of bushing 14. The purpose of coil spring 15 is to prevent lateral movement of hollow tube 12 with respect to valve assembly 13.

The valve assembly 13 is preferably formed of brass and includes a chamber 19, one end of which is provided with internal screw threading 18 for connection to piping leading to the chicken cages. The end portion of hollow tube 12 after entering valve assembly 13 through bushing 14 is bent substantially back on itself to provide a lever portion 20, which extends substantially along the longitudinal axis of chamber 19. The end of hollow tube 12 is open.

Extending upwardly from the bottom of chamber 19 adjacent the inner edge of screw threading 18 is a stud 21. While stud 21 is shown as being separately formed and inserted into an opening in the bottom of valve assembly 13, it may also be formed as an integral part thereof. An elongated coil spring 22 is tapered in a frusto-conical manner and has its wide lower end surrounding stud 21. The narrow upper end of coil spring 22 extends into a small circular opening 23 which is cut in the bottom of lever portion 20 of hollow tube 12. Coil spring 22 bears against lever portion 20 urging it upwardly with respect to the bottom of chamber 19.

The bottom of valve assembly 13 is provided with an integral inlet nipple 24, which extends downwardly therefrom at a right angle. The outside of inlet nipple 24 is provided with external screw threading 25, which is adapted to be attached to a conventional source of water supply. The inside of inlet nipple 24 is provided with a passage 26, which extends at substantially a right angle to chamber 19 and connects therewith.

The upper end of passage 26 is provided with internal screw threading 27. A water inlet member 28 is provided with a wide head 29 having a transverse slot 30, which is adapted to receive the end of a screw driver blade. A narrower shank 31 is provided with external screw threading 32, which is complementary to the internal screw threading 27 of passage 26. Water inlet member 28 is provided with a bore 33, which extends along the longitudinal axis thereof from one end of the member to the other.

The end of water inlet member 28 remote from head 29 comprises a narrow portion 34, which is smaller in diameter than passage 26. The end of narrow portion 34 extendes into chamber 19 and is disposed adjacent and directly beneath the lever portion 20 of hollow tube 12.

A control member 35 has a hollow shank, the inner diameter of which is slightly larger than the outer diameter of narrow portion 34 of water inlet member 28. A sealing disk 36, which is formed of resilient material such as rubber, is mounted within the closed upper end of control member 35. An air hole 37 is provided to permit air to leave as the sealing disk 36 is inserted into place. A pair of oppositely disposed water outlet openings 38 extend through the side walls of shank 36 adjacent the upper end thereof.

Control member 35 is slidably mounted on the upper end of narrow portion 34, with its upper end engaging the lower edge of lever portion 20. Water inlet member 28 is mounted within inlet nipple 24, its external screw threading 25 engaging the internal screw threading 27 of passage 26. The assembly is accomplished by mounting control member 35 on top of narrow portion 34 and by inserting water inlet member 28 into passage and using a screw driver to tighten it into place.

In use, all of the component parts of my device are assembled at the factory, so that the poultry man is provided with a single valve fitting, to which the hollow tube and reservoir are attached. The inlet nipple 24 is connected by the poultry man to a suitable conventional source of water supply, while the screw threading 18 is used to connect the water pipe leading to the cages.

When the water is turned on, it flows upwardly through passage 27 and then through bore 33. Since reservoir 10 is empty at this time, it is disposed in its uppermost position, causing hollow tube 12 and its lever portion 20 to assume an upwardly directed angle, caused by the lifting pressure from coil spring 22.

Lever portion 20 is accordingly out of engagement with the top of control member 35. The water exerts pressure against sealing disk 36 to lift it off the top end of narrow portion 34. The water then flows out of narrow portion 34 and out through the openings 38 in the sides of control member 35 into chamber 19.

From chamber 19, most of the water flows out to the chicken cages, while some flows into hollow tube 12 and is forced upwardly into reservoir 10. As reservoir 10 begins to fill, the weight of the water held therein exerts pressure to pivot hollow tube 12 downwardly, moving lever portion 20 downwardly against the pressure of coil spring 22. As lever portion 20 moves downwardly, it exerts downward pressure on control member 25, finally bringing sealing disk 36 down to seal off the upper end of narrow portion 34 and prevent further water from flowing into chamber 19.

As water is consumed from the outlet pipe by the poultry, some of the water flows out of water reservoir 10. As soon as sufficient water is removed from reservoir 10, coil spring 22 lifts lever portion 20, permitting additional water to enter chamber 19. In practice, a delicate balance is maintained whereby constant water pressure is maintained in the line to the chicken cages. Conventional poultry watering devices may be attached to the outlet line and fed under pressure which is reduced from that present in the conventional water supply.

It will be noted that my valve system is of such a nature as to prevent any undesirable siphoning action from taking place, drawing water from chamber 19 back to the source of supply. If a vacuum or suction should occur in the supply line, it acts to draw sealing disk 36 into engagement with the end of narrow portion 34, preventing any undesirable backward flowing of water.

With regard to the operation of my device, it will be noted that my device does not operate on a water level principle, in which the level of the water in the reservoir corresponds to that in a tank. The reservoir is substantially higher than the chamber and the water must be forced upwardly to the reservoir by the pressure from the source of water supply. The principle of operation of my device may be described as an inverse counterbalance. I provide a resilient member which is disposed within the fitting and which opposes and counter-balances the weight of this water which is moved into the reservoir by the water pressure. Because of the reversal in direction of the lever portion 20 of hollow tube 12, the direction of force of the resilient member is inverted from that of a conventional counter-balance.

I claim:

1. An automatic water control device comprising a fitting having a water inlet nipple adapted to be connected to a source of high pressure water supply, said fitting having a water outlet, said inlet nipple and outlet being connected to a chamber, said inlet nipple having internal screw threading, an inlet member screw threadedly mounted within said nipple, said inlet member having a tubular narrow portion extending into said chamber, said inlet member having a bore extending therethrough, said bore being substantially smaller in diameter than the diameter of said nipple, a control member slidably mounted on said narrow portion, said control member having a substantially cylindrical shank surrounding said narrow portion, the upper end of said shank being sealed off by a resilient disk, said disk extending transversely adjacent the open end of said narrow portion, an elongated hollow tube pivotally mounted with respect to said fitting, said tube having one end thereof extending into said fitting, said end having a lever portion disposed within said chamber adjacent the upper end of said control member, a coil spring having its lower end bearing against the bottom of said chamber and its upper end bearing against said lever portion, a water reservoir connected to the opposite end of said tube, said tube adapted to carry water from said chamber to said reservoir and vice versa, said disk adapted to seal off the upper end of said bore to prevent the flow of water from said inlet nipple into said chamber when said reservoir contains a given quantity of water, said reservoir pivoting said tube and lever portion downwardly, exerting downward pressure on the upper end of said control member to bring said disk into sealing engagement with the end of said narrow portion, said coil spring exerting pressure on the bottom of said lever portion to counteract the downward pressure of said reservoir and permit water to flow into said chamber when said reservoir contains less than said given quantity of water.

2. An automatic water control device comprising a fitting having a water inlet adapted to be connected to a source of high pressure water supply, said fitting having a water outlet, said inlet and outlet being connected to a chamber, an inlet member mounted within said inlet, said inlet member having a portion extending into said chamber, said inlet member having a bore extending therethrough, said bore being substantially smaller in diameter than the diameter of said nipple, a control member slidably mounted on the portion of said inlet member which extends into said chamber, the upper portion of said control member carrying a resilient disk, an elongated hollow tube pivotally mounted with respect to said fitting, said tube having one end thereof extending into said fitting, said end having a lever portion disposed within said chamber adjacent the upper end of said control member, a coil spring having one end exerting upward pressure against said lever portion, a water reservoir connected to the opposite end of said tube, said tube adapted to carry water from said chamber to said reservoir and vice versa, said disk adapted to seal off the upper end of said bore to prevent the flow of water from said inlet into said chamber when said reservoir contains a given quantity of water, said reservoir pivoting said tube and lever portion downwardly, exerting downward pressure on the upper end of said control member to bring said disk into sealing engagement with the end of said inlet member, said coil spring exerting pressure on said lever portion to counteract the downward pressure of said reservoir and permit water to flow into said chamber when said reservoir contains less than said given quantity of water.

3. An automatic water control device comprising a fitting having a water inlet nipple and a water outlet, said inlet and outlet being connected to a chamber, an inlet member mounted within said inlet, said inlet member mounted within said inlet, said inlet member having a portion extending into said chamber, said inlet member having a bore extending therethrough, said bore being substantially smaller in diameter than the diameter of said nipple, a control member slidably mounted on said portion, said control member having a closed top, an elongated hollow tube pivotally mounted with respect to said fitting, said tube having one end thereof extending into said fitting, said end having a lever portion disposed within said chamber adjacent the upper end of said control member, a coil spring exerting upward pressure on said lever portion, a water reservoir connected to the opposite end of said tube, said tube adapted to carry water from said chamber to said reservoir and vice versa, the top of said control member adapted to seal off the upper end of said bore to prevent the flow of water from said inlet into said chamber when said reservoir contains a given quantity of water, said reservoir pivoting said tube and lever portion downwardly, exerting downward pressure on the upper end of said control member to bring its closed top into sealing engagement with the end of said inlet member, said coil spring exerting pressure on said lever portion to counteract the downward pressure of said reservoir and permit water to flow into said chamber when said reservoir contains less than said given quantity of water.

4. An automatic water control device comprising a fitting having a water inlet and a water outlet, said inlet and outlet being connected to a chamber, an inlet member having a bore connected to said inlet, said inlet member having a portion extending into said chamber, a control member slidably mounted on said inlet member, said control member having a closed top, an elongated hollow tube pivotally mounted with respect to said fitting, said tube having one end thereof extending into said fitting, said end having a lever portion disposed within said chamber adjacent the upper end of said control member, resilient means exerting lifting pressure against said lever portion, a water reservoir connected to the opposite end of said tube, said tube adapted to carry water from said chamber to said reservoir and vice versa, the closed top of said control member adapted to seal off the upper end of said bore to prevent the flow of water from said inlet into said chamber with said reservoir containing a given quantity of water.

5. An automatic water control device comprising a fitting having a water inlet and a water outlet, said inlet and outlet being connected to a chamber, an inlet member having a bore connected to said inlet, said inlet member having an upwardly directed portion extending into said chamber, a control member slidably mounted on the upwardly directed portion of said inlet member, said control member having a closed top, an elongated hollow tube pivotally mounted with respect to said fitting, said tube having one end thereof extending into said fitting, said end having a lever portion disposed within said chamber adjacent the upper end of said control member, resilient means exerting lifting pressure against said lever portion, said resilient means comprising an upwardly directed coil spring extending between the bottom of said fitting and said lever portion, said coil spring being spaced from and extending substantially parallel to the upwardly directed portion of said inlet member, a water reservoir connected to the opposite end of said tube, said tube adapted to carry water from said chamber to said reservoir and vice versa, the closed top of said control member adapted to seal off the upper end of said bore to prevent the flow of water from said inlet into said chamber when said reservoir contains a given quantity of water.

6. An automatic water control device comprising a fitting having a water inlet and a water outlet, said inlet and outlet being connected to a chamber, an inlet member having a bore connected to said inlet, said inlet member having an upwardly directed portion extending into said chamber, a control member slidably mounted on the upwardly directed portion of said inlet member, an elongated hollow tube pivotally mounted with respect to said fitting, said tube having one end thereof extending into said fitting, said end having a lever portion disposed within said chamber adjacent the upper end of said control member, resilient means exerting lifting pressure against said lever portion, said resilient means comprising an upwardly directed coil spring extending between the bottom of said fitting and said lever portion, said coil spring being spaced from and extending substantially parallel to the upwardly directed portion of said inlet member, a water reservoir connected to the opposite end of said tube, said tube adapted to carry water from said chamber to said reservoir and vice versa, said control member adapted to seal off the upper end of said bore to prevent the flow of water from said inlet into said chamber when said reservoir contains a given quantity of water.

7. An automatic water control device comprising a fitting having a water inlet adapted to be connected to a source of high pressure water supply, said fitting having a water outlet, said inlet and outlet being connected to a chamber, an inlet member mounted within said inlet, said inlet member having a portion extending into said chamber, said inlet member having a bore extending therethrough, said bore being substantially smaller in diameter than the diameter of said nipple, a control member slidably mounted on the portion of said inlet member which extends into said chamber, the upper portion of said control member carrying a resilient disk, an elongated hollow tube pivotally mounted with respect to said fitting, said tube having one end thereof extending into said fitting, a water reservoir connected to the opposite end of said tube, said tube adapted to carry water from said chamber to said reservoir and vice versa, said disk adapted to seal off the upper end of said bore to prevent the flow of water from said inlet into said chamber when said reservoir contains a given quantity of water, said reservoir pivoting said tube and lever portion downwardly, exerting downward pressure on the upper end of said control member to bring said disk into sealing engagement with the end of said inlet member, and resilient means exerting pressure urging said reservoir upwardly to counteract the downward pressure of said reservoir and permit water to flow into said chamber when said reservoir contains less than said given quantity of water.

8. An automatic water control device comprising a fitting having a water inlet nipple and a water outlet, said inlet and outlet being connected to a chamber, an inlet member mounted within said inlet, said inlet member mounted within said inlet, said inlet member having a portion extending into said chamber, said inlet member having a bore extending therethrough, said bore being substantially smaller in diameter than the diameter of said nipple, a control member slidably mounted on said portion, said control member having a closed top, an elongated hollow tube pivotally mounted with respect to said fitting, said tube having one end thereof extending into said fitting, said tube adapted to carry water from said chamber to said reservoir and vice versa, the top of said control member adapted to seal off the upper end of said bore to prevent the flow of water from said inlet into said chamber when said reservoir contains a given quantity of water, said reservoir pivoting said tube and lever portion downwardly, exerting downward pressure on the upper end of said control member to bring its closed top into sealing engagement with the end of said inlet member, and resilient means urging said reservoir upwardly to counteract the downward pressure of said reservoir and permit water to flow into said chamber when said reservoir contains less than said given quantity of water.

9. An automatic water control device comprising a fitting having a water inlet and a water outlet, said inlet and outlet being connected to a chamber, an inlet member having a bore connected to said inlet, said inlet member having a portion extending into said chamber, a control member slidably mounted on said inlet member, said control member having a closed top, an elongated hollow tube pivotally mounted with respect to said fitting, said tube having one end thereof extending into said fitting, a water reservoir connected to the opposite end of said tube, resilient means normally urging said reservoir upwardly, said tube adapted to carry water from said chamber to said reservoir and vice versa, the closed top of said control member adapted to seal off the upper end of said bore to prevent the flow of water from said inlet into said chamber when said reservoir contains a given quantity of water.

References Cited in the file of this patent

UNITED STATES PATENTS 2,748,795    Kofford _____ June 5, 1956